United States Patent [19]

Bearden

[11] 4,381,558
[45] Apr. 26, 1983

[54] TALKING GREETING CARD

[76] Inventor: Robert Bearden, 33571 Divers Ct., Dana Point, Calif. 92629

[21] Appl. No.: 267,037

[22] Filed: May 26, 1981

[51] Int. Cl.³ .......................... G11B 1/00; G11B 3/00
[52] U.S. Cl. ................................................ 369/68
[58] Field of Search ................................. 369/68, 63

[56]  References Cited

U.S. PATENT DOCUMENTS

| | | | |
|---|---|---|---|
| 695,159 | 3/1902 | Lambert | 369/63 |
| 2,042,736 | 6/1936 | Schwartz | 369/68 |
| 2,164,663 | 7/1939 | Ottofy | 369/63 |
| 2,292,285 | 8/1942 | Ottofy | 369/68 |
| 2,491,037 | 12/1949 | Dofsen | 369/63 |
| 2,997,306 | 8/1961 | Hicks | 369/273 |

Primary Examiner—Steven L. Stephan
Attorney, Agent, or Firm—Lyon & Lyon

[57] ABSTRACT

A talking greeting card has a front display panel and overlapping rear panels adapted to lie substantially flat in one configuration. The front panel may be bowed in convex shape and held in such second configuration by tabs which secure the rear panels together in tension. A flexible sound record strip extends through a slot in the bowed front panel and has a surface prepared to produce sounds when a sliding element, such as the thumb nail of a user, moves along the surface. The sound is amplified by the bowed front wall and overlapping rear walls which act as a sound amplifier.

1 Claim, 4 Drawing Figures

U.S. Patent  Apr. 26, 1983  4,381,558
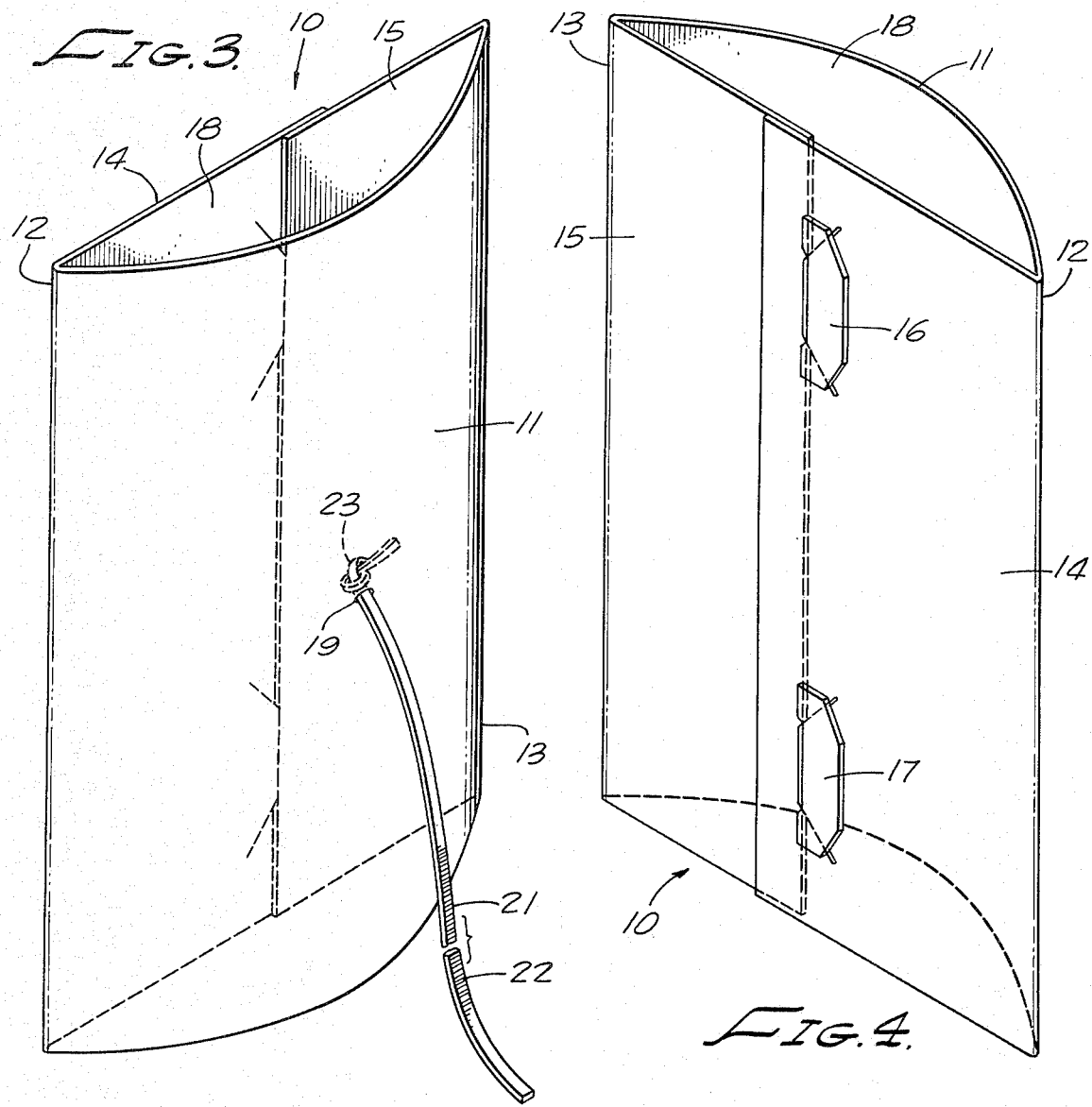

TALKING GREETING CARD

This invention relates to greeting cards and is particularly directed to an assembly which lies substantially flat in one configuration, and in another configuration has a bowed front display panel together with a flat rear panel cooperating to serve as an acoustic amplifier. A sound record strip extends through the front bowed panel and is provided with a prepared surface for producing sounds when an object such as a thumb nail is moved along the strip. The sounds thus generated are amplified by the acoustic amplifier. An enlargement at one end of the flexible sound record strip prevents the strip from being pulled through the panel slot and discharged from the panel.

Other and more detailed objects and advantages will appear hereinafter.

In the drawings:

FIG. 1 is a top plan view of the greeting card before assembly.

FIG. 2 is a top plan view of the greeting card after assembly.

FIG. 3 is a front perspective view.

FIG. 4 is a rear perspective view.

Referring to the drawings, the greeting card assembly generally designated 10 includes a front display panel 11 having side edges 12 and 13. Two rear panels 14 and 15 are joined to opposite side edges 12 and 13 and lie flat against the front display panel 11, as shown in FIG. 1, prior to assembly. The front surface of the display panel 11 may be utilized to carry any desired drawing, photograph, greeting, or other material.

Tongue and groove connections 16 and 17 permit the rear panels 14 and 15 to be secured together in overlapped position and in tension, thus causing the front display panel 11 to become bowed in a convex manner. The space 18 is thus defined between the bowed front panel 11 and the joined rear panels 14 and 15.

A small slot 19 is cut in the front panel 11 to receive a sound record strip 21 having a prepared surface 22 which produces sounds when contacted by a moving element such as, for example, the thumb nail of a user. An enlargement 23 at one end of the sound record strip 21 forms an abutment larger than the slot 19. In this way the strip 21 is held from separation from the front display panel when the thumb nail of a user is moved along the strip in a direction away from the panel 11. The enlargement or abutment 23 is positioned within the space 18 so that its presence is hidden.

Sound vibrations generated by sliding contact of the thumb nail along the surface 22 are amplified by the panels 11, 14 and 15 serving as an acoustic amplifier.

The bowed front panel 11 not only provides the space 18 for receiving the enlargement 23 and for cooperating with the panels 14 and 15 to produce an acoustic amplifier, but it also permits the greeting card assembly to stand upright on a supporting surface such as a table top. One hand of a user may be used to hold the greeting card assembly in upright position on the supporting surface while the thumb and index finger of the other hand lightly pinch the sound record tape 21 between them. The thumb nail contacts the prepared surface 22. A sliding motion of the thumb and index finger along the sound record strip 21 in a direction away from the panel 11 produces audible sounds such as a series of words "Merry Christmas" or "Happy Birthday" or "Get Well Soon", etc. The front display panel 11 may depict a scene which corresponds to the particular wording derived from the sound record strip 21.

Having fully described my invention, it is to be understood that I am not to be limited to the details herein set forth but that my invention is of the full scope of the appended claims.

I claim:

1. In a greeting card assembly, the combination of: a front display panel having side edges, two rear panels joined to opposite side edges of said front panel, said three panels being adapted to lie substantially flat in one configuration, means for joining said rear panels together in tension and in a second configuration to cause said front panel to bow in a convex manner and thereby form a space between the joined rear panels and the bowed front panel, the front panel having a slot, a flexible sound record strip extending through the slot in close contact with said front panel and having an abutment positioned within said space, the abutment being too large to pass through said slot, said sound record strip having a prepared surface which produces audible sounds upon sliding contact with a moving element such as the thumb nail of a user, the front and rear panels serving as an acoustic amplifier for such sounds.

* * * * *